United States Patent Office 3,576,779
Patented Apr. 27, 1971

3,576,779
AMINE-FUNCTIONAL ORGANOPOLYSILOXANE, SALT THEREOF AND POLISH COMPOSITION THEREFROM
Norman G. Holdstock, Schenectady, Raymond J. Thimineur, Scotia, and Abe Berger, Schenectady, N.Y., assignors to General Electric Company
No Drawing. Continuation-in-part of application Ser. No. 693,140, Dec. 26, 1967. This application July 17, 1968, Ser. No. 745,376
Int. Cl. C08g 31/24; C09g 1/04, 1/12
U.S. Cl. 260—29.2                                     15 Claims

ABSTRACT OF THE DISCLOSURE

Organopolysiloxane copolymers are prepared by the partial hydrolysis and condensation of a silanol chain-stopped polydiorganosiloxane, an aminoalkyltrialkoxysilane, and an aminoalkoxyalkyltrialkoxysilane. These copolymers are converted to partial salts by reaction with with aliphatic carboxylic acids and the partial salts are used in detergent resistant polish formulations of improved rub-out and gloss.

---

This application is a continuation-in-part of our copending application, Ser. No. 693,140 filed Dec. 26, 1967 now abandoned, and assigned to the same assignee as the present invention.

This invention relates to a new class of organopolysiloxane copolymers, to salts thereof, and to the use of such salts in polish compositions of improved detergent resistancy, improved rub-out and improved gloss.

The use of organopolysiloxanes with or without waxes in polish compositions for the protection and appearance enhancement of various painted surfaces is well known in the art. The organopolysiloxanes have been used in such compositions because of improved rub-out. Improved rub-out is an increased ease with which the polish composition can be spread upon the surface to be treated and rubbed to a non-streaked, uniform surface.

While silicones have gained very wide acceptance in this application, it has been generally recognized that these compositions were not as permanent a finish as desired, since the detergents commonly employed in washing polished surfaces tend to remove the polishing composition. In order to solve this problem, attempts have been made to add so-called detergent resistant silicones of various types to such compositions. While this has led to compositions of improved detergent resistancy, the resulting compositions were difficult to rub out and exhibited a relatively inferior gloss, as compared with the more conventional silicone-containing polish compositions.

The present invention is based on our discovery of a new organopolysiloxane copolymer and the partial carboxylic salt thereof which is useful in polish compositions to provide the improved rub-out and gloss normally associated with conventional organopolysiloxane-containing polish and wax formulations, but which, in addition, exhibits improved detergent resistance.

The organopolysiloxane copolymers of the present invention comprise the partial hydrolysis and condensation product of (1) a liquid silanol chain-stopped polydiorganosiloxane having the formula:

(1) 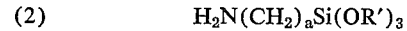

(2) an aminoalkylsilane having the formula:

(2) $\quad H_2N(CH_2)_aSi(OR')_3$ and (3) an aminoalkoxyalkylsilane having the formula:

(3) $\quad H_2NCH_2(CR'''_2)_bOR''Si(OR')_3$ where R represents monovalent hydrocarbon radicals free of aliphatic unsaturation, at least 90% of which are methyl radicals, R' is an alkyl radical having up to 4 carbon atoms, R'' is a divalent alkylene radical containing from 2 to 6 carbon atoms, R''' is a monovalent organic radical or hydrogen, $n$ has a value of from about 2 to 20, inclusive, $a$ is an integer equal to from 3 to 6, inclusive, and $b$ is an integer equal to from 2 to 5, inclusive, said copolymer having a viscosity of from about 5 to 1,000 centistokes at 25° C. and containing from about 1 to 15 percent by weight —OR' radicals based on the weight of said copolymer, the proportions of said polydiorganosiloxane, said aminoalkylsilane, and said aminoalkoxyalkylsilane being selected to provide a total of from about 0.04 to 1.0 siloxane units derived from said aminoalkylsilane and said aminoalkoxyalkylsilane per siloxane unit derived from said polydiorganosiloxane and from about 0.25 to 9 siloxane units derived from said aminoalkylsilane per siloxane unit derived from said aminoalkoxyalkylsilane.

The partial aliphatic carboxylic acid salts of the present invention are salts of said organosiloxane copolymer and an aliphatic carboxylic acid in which from about 10 to 50 percent of the amine groups of the aminoalkyl radicals of the said aminoalkylsilane and said aminoalkoxyalkylsilane are converted to amine salts.

The polish compositions of the present invention of improved rub-out, improved gloss and improved detergent resistance are emulsions comprising water, a partial aliphatic carboxylic acid salt of said organopolysiloxane copolymer, a hydrocarbon solvent, and an emulsifying agent.

The organopolysiloxane copolymers of the present invention are unique compositions and exhibit properties which could not have been predicted from the nature of the components therein. Thus, if the composition is prepared only from the polydiorganosiloxane of Formula 1 and the aminoalkylsilane of Formula 2, the resulting polish composition exhibits detergent resistancy but is very deficient in rub-out and gloss. In addition, the composition does not emulsify satisfactorily. When an analogous composition is prepared from the polydioragnosiloxane fluid of Formula 1 and the aminoalkoxyalkylsilane of Formula 3, the material does exhibit detergent resistancy, but does not deposit uniformly and does not have as easy rub-out and high gloss as desired. When the composition contains the polydimethylsiloxane of Formula 1, the aminoalkylsilane of Formula 2 and the aminoalkoxyalkylsilane of Formula 3 but is added to a polish formulation without converting a portion of the amine groups to aliphatic carboxylic acid salts, the product does not form a stable emulsion. Thus, the compositions containing the polydiorganosiloxane of Formula 1, the aminoalkylsilane of Formula 2 and the aminoalkoxyalkylsilane of Formula 3 are unique compositions and, when combined with the aliphatic carboxylic acid, form additional unique compositions which are converted to unique polish compositions.

The organopolysiloxane copolymers, which contain aminoalkoxyalkyl radicals free of chain branching are formed from known types of organosilicon materials and the method of forming such copolymers is relatively conventional, even though the proportions of components employed in the copolymers is relatively fixed and even though the degree of partial hydrolysis is relatively fixed in order to provide the compositions of the present invention.

On the other hand, the oragnopolysiloxane copolymers which contain aminoalkoxyalkyl radicals which contain chain branching on the alkoxy radical are new compositions of matter possessing unique and unexpected properties when incorporated into polish compositions. The methods employed for forming such copolymers will be set forth in detail.

The silanol chain-stopped polydiorganosiloxane of Formula 1 is well known in the art, with various silano chain-stopped polydimethylsiloxanes being readily available materials. In the preferred embodiment of our invention, the silanol fluid is a silanol chain-stopped polydimethylsiloxane and, in the preferred embodiment of our invention, the material is relatively low molecular weight and contains an average of from about 4 to 7 dimethylsiloxane units per molecule, even though the compositions of the present invention broadly encompass compositions containing from 2 to about 20 diorganosiloxane units per molecule.

As mentioned earlier, at least about 90% of the R groups in the polydiorganosiloxane of Formula 1 should be methyl radicals. Where the R groups are radicals other than methyl, it is preferred that the other radicals be selected from the class consisting of ethyl and phenyl. However, within the scope of the present invention are those polydiorganosiloxanes in which the silicon-bonded organic groups other than methyl include the broad class of organic hydrocarbon groups free of aliphatic unsaturation which are normally associated with silicones. Thus, other radicals represented by R include alkyl radicals, such as propyl, butyl, octyl, octadecyl, etc. radicals; cycloalkyl radicals, e.g., cycloheptyl, cyclohexyl, etc. radicals; monocyclic and polycyclic aryl radicals, e.g., phenyl, tolyl, xylyl, naphthyl, etc. radicals; aralkyl radicals, particularly monocyclic lower aralkyl radicals, e.g., benzyl, phenylethyl, phenylpropyl, etc. radicals. These radicals other than methyl can be present in the polydiorganosiloxane in any of the conventional fashions as, for example, being attached to the same silicon atom to which a methyl radical is attached, or being attached to a silicon atom which is free of methyl radicals. Likewise, a given silicon atom can contain a mixture of radicals other than methyl. Thus, these radicals other than methyl can be present in the polydiorganosiloxane as methylethylsiloxane units, methylpropylsiloxane units, methylphenylsiloxane units, diphenylsiloxane units, phenylethylsiloxane units, etc.

The aminoalkylsilanes of Formula 2 are aminoalkyltrialkoxysilanes which are well known in the art and their preparation is described, for example, in Patent 2,930,809—Jex et al. These materials are generally formed by reduction of the corresponding cyanoalkyltrialkoxysilane by the use of hydrogen in the presence of a conventional hydrogenation catalyst, such as Raney nickel. As is apparent from the definition of R′, the aminoalkyltrialkoxysilanes include those in which the alkyl radical ranges from methyl to butyl.

Illustrative of the specific aminoalkyltrialkoxysilanes within the scope of Formula 2 is the preferred silane which is gamma-aminopropyltrimethoxysilane, as well as other materials, such as gamma-aminopropyltriethoxysilane, omega-aminohexyltributoxysilane, etc. While the aminoalkylsilane has been described as a monoaminoalkyltrialkoxysilane in Formula 2 and in the preceding description, it should be understood that minor amounts of difunctional aminoalkylsilanes can also be present in the initial starting materials and in the final copolymers of the present invention. Such materials are prepared by the same process by which the gamma-aminopropyltrialkoxysilanes are prepared and, in particular, involves the reduction of a substituted cyanoalkyldialkoxysilane. For example, gamma-aminopropylmethyldimethoxysilane can be prepared from beta-cyanoethylmethyldimethoxysilane by hydrogenation of the nitrile radical to the corresponding amino group. Thus, it is within the scope of the present invention that up to about 10% by weight of the aminolakyltrialkoxysilane of Formula 2 can be replaced by a difunctional silane which has the formula:

(4) 

where R′, R, and a are as previously defined.

The aminoalkoxyalkylsilanes within the scope of Formula 3 are monoaminoalkoxyalkyltrialkoxysilanes, as is apparent from Formula 3. While these materials are relatively new in the art, reference to compounds within the generic Formula 3 containing unbranched aminoalkoxy radicals is found, for example, in V. M. Vdorin, R. Sultanov, T. A. Sladkova, L. KH. Freidlin, and A. A. Petrov, Izvest. Akad. Nauk. S.S.S.R., Otdel. Khim. Nauk. 1961, 2007–12 and U.S. Pat. 3,341,563 Buchheit 1957.

The aminoalkoxyalkylsilanes of Formula 3 are formed by reducing the corresponding cyano alkoxyalkylsilane with hydrogen in the presence of a hydrogenation catalyst, such as finely divided Raney nickel and isolating the product by fractional distillation.

The cyanoalkoxyalkyl-substituted silanes in turn are formed by reaction of a cyanoalkyl ether of an unsaturated alcohol with a trialkoxysilane in the presence of an appropriate catalyst for the addition of the silicon-hydrogen linkage of the trialkoxysilane across the olefinic double bond of the unsaturated ether. Thus, cyanoethoxypropyltrimethoxysilane can be prepared by reacting the cyanoethyl ether of allyl alcohol with trimethoxysilane in the presence of a minor amount of chloroplatinic acid by means well known in the art. The cyanoalkoxyalkylsilanes which are free of chain branching on the cyanoalkoxy radical are known in the art, e.g., J. L. Speier, J. A. Webster and G. H. Barnes, J. Am. Chem. Soc. 79, 974 (1957).

Another illustration of the preparation of one of the cyanoalkoxyalkylsilanes is the reaction of triethoxysilane with the vinyl ether of ethylene cyanohydrin to produce cyanoethoxyethyltriethoxysilane, which can be reduced with hydrogen to the 2-(3-aminopropoxy)ethyltriethoxysilane. Similarly, 3-(2-cyanoethoxy) - 2 - methylpropyltrimethoxysilane is prepared by adding trimethoxysilane across the double bonds of the methallyl ether of ethylene cyanohydrin and is then reduced to 3-(3-aminopropoxy)-2-methylpropyltrimethoxysilane.

From the description of the preparation of the compositions of Formula 3, it is seen that the cyanopropoxy radical is attached to silicon through at least two carbon atoms.

The cyanoalkoxyalkylsilanes which contain chain branching in the cyanoalkoxy radical are made by reacting a branched chain nitrile containing conjugated unsaturation, such as methacrylonitrile with an unsaturated alcohol in the presence of a quaternary ammonium hydroxide type of anion exchange resins. The use of the quaternary ammonium hydroxide type of anion exchange resin in cyanoethylation reactions is known in the art, e.g., M. J. Astle and R. W. Etherington, Ind. and Eng. Chem. 44, 2871 (1952).

Illustrative aminoalkoxyalkylsilanes within the scope of Formula 3 include the preferred material, which is 3 - (2 - methyl - 3 - aminopropoxy)propyltrimethoxysilane, as well as other materials, such as 3-(3-aminopropoxy)-2-methylpropyltrimethoxysilane,
3-(2-aminoethoxy)propyltripropoxysilane,
2-(3-aminopropoxy)ethyltrimethoxysilane,
3-(6-aminohexoxy)propyltributoxysilane,
6-(3-aminopropoxy)-hexyltrimethoxysilane,
3-(3-aminopropoxy)propyltrimethoxysilane,
3-(1-methyl-3-aminopropoxy)-2-methylpropyltrimethoxysilane, etc.

While the aminoalkoxyalkylsilanes of Formula 3 have been described as monoaminoalkoxyalkyltrialkoxysilanes, it should be understood that minor amounts of difunctional materials containing the same carbon functional group can also be employed in this invention. For example, the silane of Formula 3 can be modified by including therein minor amounts, e.g., up to 10% by weight of difunctional silanes having the formula:

(5) $\quad H_2N(CR'''_2)_bOR''Si(R)(OR')_2$ where R, R', R'', R''' and $b$ are as previously defined. The preparation of the difunctional materials of Formula 5 is analogous to the processes employed in the preparation of the trifunctional aminoalkoxyalkylsilanes within the scope of Formula 3, except that the starting material contains a single silicon-bonded R group and only two silicon-bonded alkoxy groups. Illustrative of the difunctional compositions within the scope of Formula 5 are, for example, 3-(3-amino-isobutoxy)propylmethyldimethoxysilane,
3-(3-aminopropoxy)propylmethyldimethoxysilane,
4-(6-aminohexoxy)butylphenyldipropoxysilane,
3-(3-amino-2-methylpropoxy)propylethyldimethoxysilane, etc.

The use of the difuctional silane of Formula 5 in minor amounts leads to the presence of siloxane units corresponding to the difunctional silane in the organopolysiloxane copolymer, which results from the hydrolysis and condensation reaction employed in preparing the copolymers of the present invention.

In preparing the organopolysiloxane copolymers the mixture of the silanol chain terminated polydiorganosiloxane of Formula 1, the aminoalkylsilane of Formula 2, and the aminoalkoxyalkylsilane of Formula 3 are partially hydrolyzed and condensed by the mixing of the reactants and the addition of an amount of water necessary to result in the degree of hydrolysis and condensation desired. The amount of hydrolysis and condensation desired is that amount sufficient to result in a copolymer containing the desired viscosity and the desired alkoxy content. The reaction between the water and the other components of the hydrolysis and condensation mixture is first to hydrolyze the silicon-bonded alkoxy groups of the gamma-aminoalkylsilane of Formula 2 and the aminoalkoxyalkylsilane of Formula 3 and replace some of the alkoxy groups with hydroxyl groups. These hydroxyl groups then condense with each other to form new siloxane linkages, which results in an increase in viscosity of the reaction mixture and in the formation of the organopolysiloxane copolymer. The amount of water which is used in preparing the copolymers is, of course, within the skill of the art, but is less than one molecule of water per silicon-bonded alkoxy group in the silane of Formula 2 and Formula 3, since it is desired to keep in the reaction product from 1 to 15 percent by weight of alkoxy groups. After the partial hydrolysis and condensation of the mixture of the silanol-terminated polydiorganosiloxane of Formula 1, the silane of Formula 2 and the silane of Formula 3, the reaction mixture consists of the organopolysiloxane copolymer, free alcohol corresponding to the alkoxy group which is hydrolyzed from the silane by the water addition, and water resulting from the condensation of silanol groups. This water and alcohol can be left in the reaction mixture or can be readily stripped therefrom by stripping at reduced pressures at temperatures ranging from room temperature up to 20 to 40° C. In the preferred embodiment of our invention, the water and alcohol are not separated from the reaction products, since they have no adverse effect on the reaction products or on the salts and polish emulsions made therefrom.

While we do not wish to be bound by theory, we believe that the silanol chain-stopped polydiorganosiloxanes of Formula 1 and the silanes of Formula 2 react without any significant rearrangement and condensation of the initial reaction products so that the polydiorganosiloxane units present in the initial starting material of Formula 1 remain in a substantially unaffected block in the organopolysiloxane copolymer. Thus, if the siloxane and the silanol chain-terminated polydimethylsiloxane of Formula 1 were a material within the scope of Formula 1 when $n$ was equal to 5, the resulting copolymer would contain blocks of 5 diorganosiloxane units separated by siloxane units derived from the silane of Formula 2 or the silane of Formula 3.

The proportions of the polydiorganosiloxane of Formula 1 and the silanes of Formula 2 and Formula 3 are selected so that the final product contains a total of from .04 to 1.0 siloxane units derived from the silane of Formula 2 and the silane of Formula 3 per siloxane unit derived from the polydiorganosiloxane of Formula 1. The relative proportions are also selected so that from 0.25 to 9 siloxane units are derived from the aminoalkylsilane of Formula 2 per siloxane unit derived from the aminoalkoxyalkylsilane of Formula 3.

The organopolysiloxane copolymer is converted to a partial aliphatic carboxylic acid salt by reacting the copolymer with an amount of aliphatic carboxylic acid sufficient to convert from 10 to 50 percent of the amine groups to amine salt groups. In general, the reaction between the amine groups of the copolymer is substantially stoichiometric and the amount of aliphatic carboxylic acid salt employed is sufficient to convert from 10 to 50 percent of the amine groups in the organopolysiloxane copolymer to carboxylic acid salt groups.

Among the aliphatic carboxylic acids which are useful in preparing the salts of the present invention are all of the conventional monobasic aliphatic carboxylic acids, both saturated and unsaturated. Useful aliphatic carboxylic acids include the saturated monobasic acids free of substituents other than carbon and hydrogen, aside from the carboxyl group, such as formic acid, acetic acid, n-butyric acid, caproic acid, lauric acid, stearic acid, etc. Among the aliphatically unsaturated acids containing only carbon and hydrogen outside of the carboxyl group are angelic acid, tiglic acid, crotonic acid, acrylic acid, undecylenic acid, oleic acid, linoleic acid, linolenic acid, etc.

While all of the foregoing acids are useful in forming the salts of the present invention, in the preferred embodiment of our invention, the acid is a lower molecular weight acid, such as acids containing up to about 8 carbon atoms. The preferred specific aliphatic caboxylic acid useful in the practice of the present invention is acetic acid.

In order to form the salt of the present invention, the aliphatic carboxylic acid is merely dissolved into the organopolysiloxane copolymer and the amine salt of the acid is immediately formed and is a stable product. On the other hand, as is described in more detail hereinafter, the organopolysiloxane copolymer can be converted to the acid salt at the same time as the organopolysiloxane copolymer is formed into a polish composition by the addition of the aliphatic carboxylic acid at the same time as the other components of the polish composition are added. The result is equivalent in both cases.

The polish emulsions of the present invention of improved rub-out, improved gloss and improved detergent resistance comprise the partial aliphatic carboxylic acid salts of the present invention, one or more solvents, one or more emulsifying agents, and water as essential ingredients. In addition, these polish emulsions can also contain abrasives, waxes, thickeners, stabilizers, and conventional silicone fluids.

The solvents employed in the practice of the present invention are preferably aliphatic hydrocarbon solvents which act as partial solvents for the partial aliphatic carboxylic acid salts of the present invention and for any additional conventional silicone fluid employed in the composition. Suitable hydrocarbon solvents include coal tar naphtha, cyclohexane, gasoline, isoparaffins, naphtha, Stoddard's solvent, mineral spirits, etc.

The emulsifying agents employed in the practice of the present invention are those emulsifying agents suitable for effecting emulsification of the composition. Generally, the emulsifying agent can be cationic, anionic, or non-ionic, with the particular emulsifying agent or combination of emulsifying agents being adjusted by those skilled in the art to provide the desired emulsification characteristics. Suitable cationic emulsifiers include mono and diglycerides of edible fats and oils; sorbitan fatty acid esters, such as sorbitan monooleate, sorbitan monolaurate, sorbitan monopalmitates, sorbitan monostearate, sorbitan dioleate, sorbitan tristearate, sorbitan trioleate, etc.; polyoxyalkylene sorbitol fatty acid esters, such as polyoxyethylene sorbitan monolaurate, monopalmitate, monostearate, monooleate, trioleate, etc.; polyoxyalkylene sorbitol esters, such as polyoxyethylene sorbitol oleate, laurate, etc.; polyoxyethylene acids, such as polyoxyethylene stearates, polyoxyethylene palmitates, polyoxyethylene laurates, etc.; polyoxyalkylene ethers, e.g., polyoxyethylene lauryl ether, cetyl ether, stearyl ether, olelyl ether, tridecyl ether, etc.; polyoxyethylene fatty glycerides; polyoxyalkylene alkyl amines; N-cetyl-N-ethylmorpholinium ethosulfates; N-soya-N-ethylmorpholinium ethosulfates; N-soya-N-ethylmorpholinium ethosulfates; alkylaryl sulfonates; quaternary amine acetates; polyoxyethylene nonyl phenols; sodium dioctylsulfosuccinates; morpholine oleate; triethanolamine stearic acid salts; etc. In some cases, where the emulsifying agent is a salt, such as a salt of an amine, the amine and the acid portion of the amine salt are added separately to the reaction mixture or are added as separate components of the reaction mixture and the amine salt emulsifier is formed in situ. Thus, where the emulsifier is a material such as morpholine oleate, the oleic acid is added separately from the morpholine to produce the emulsifying agent.

Where a wax is employed in the composition of the present invention, any of the conventional waxes employed in polishing compositions are satisfactory. Included among these waxes are paraffins, micro-crystaline waxes, oxidized micro-crystalline waxes, polyolefins, such as polyethylene and oxidized polyolefins, such as oxidized polyethylene, carnauba wax, bees wax, hydrogenated castor oil, etc.

The abrasives which can be employed in the compositions of the present invention are those conventional abrasives employed in polish compositions, with the most common of such being diatomaceous earth, aluminum silicate, and aluminum oxide, such as hydrated alumina. The preferred abrasive is a mixture of 15% amorphours silica having a 15 micron particle diameter, 35% aluminum silicate having a particle diameter of 3 to 10 microns and 50% of Kaolin clay. The use of this mixture gives a gloss, emulsion stability and detergent resistancy to the polish which is superior to any of the other abrasives.

Where abrasives are employed in the compositions of the present invention, it is also desirable to employ thickeners or stabilizers or suspending agents which serve to suspend the abrasive in a stable structure and prevent settling and compacting upon storage. In cases where abrasives are not employed, it is sometimes also desirable to add thickeners or stabilizers to change the consistency of the polish formulation or to insure that any insoluble materials in the polish remain in suspension. Suitable thickeners include natural gums, such as gum arabic or gum tragacanth, carboxymethyl cellulose, polyvinyl alcohol, various alginates, carboxyvinyl polymers, such as those sold under the tradename Carbopol, as well as inorganic suspending agents, such as the complex colloidal magnesium aluminum silicate sold under the trade name Veegum. Where one of the carboxyvinyl suspending agents are employed, there is also employed a sufficient amount of a neutralizing agent, such as triethanolamine, to neutralize the acid in the suspending agent.

Where silicones are employed as additives in the compositions of the present invention, the silicones employed are the conventional methyl silicone fluids common to polish technology. These materials are trimethylsilyl chain-stopped polydimethylsiloxanes having viscosities of from about 50 to 100,000 centistokes at 25° C. and are described in Patent 2,469,888—Patnode, as well as in many other places in the polish art.

While the proportions of the various components of the present invention can vary within extremely wide limits, the preferred proportions are those set forth in the following table.

TABLE I

| Component: | Weight percent |
|---|---|
| Partial salt | 0.2–6.0 |
| Solvent | 10–60 |
| Emulsifying agents | 0.5–5.0 |
| Water | 20–85 |
| Wax | 0–7.5 |
| Abrasive | 0–15 |
| Thickeners | 0–2 |
| Silicone fluid | 0–6.0 |

The water in oil emulsions of the present invention are prepared by mixing all of the components of the reaction mixture except water and any abrasive which is to be present in the final product. This mixture is effected in any convenient manner and is designed to accomplish a reasonably good dispersion of all of the components. During this mixing operation, the organopolysiloxane copolymer and the aliphatic carboxylic acid can be added separately or as a pre-formed partial aliphatic carboxylic acid salt of the copolymer. Once these compositions are mixed, the required amount of water is added and the resulting mixture is agitated under high shear to form the emulsion. Once the emulsion has been formed, any desired abrasive is added under relatively low shear mixing conditions, since satisfactory dispersion of the abrasive is readily obtained and high shear will merely tend to accelerate the wearing of the mixing apparatus.

The procedure employed for forming oil in water polish emulsions will depend upon the materials used to formulate the polish. The formulation of oil in water polish emulsions is well known in the polish art. Care must be taken, however, to neutralize any appreciable quantity of acidic materials before they come into contact with the amine functional silicones of the present invention.

The following examples are illustrative of the practice of our invention and are not intended for limitation. All parts are by weight.

In a typical preparation of 3-(3-aminopropxy)-propyltrimethoxysilane employed in the practice of the present invention, 150 parts of 3-(2-cyanoethoxy)propyltrimethoxysilane, 12 parts of finely divided Raney nickel catalyst and 0.5 part sodium methoxide were placed in a reaction vessel which was pressurized to about 55 p.s.i. with hydrogen. The reaction mixture was then heated to a temperature of 100–120° C. and the pressure of hydrogen gas is maintained at about 55 p.s.i. After hydrogen absorption ceased after 3 hours, pressure on the system was released and the liquid product was decanted from solids and fractionally distilled to produce 128 parts of 3-(3-aminopropoxy)propyltrimethoxysilane having a boiling point of 140° C. at 5 mm.

EXAMPLE 1

To a reaction vessel was added 60 parts of a silanol chain-stopped polydimethylsiloxane within the scope of Formula 1 in which $n$ was equal to about 5, 15 parts of 3-(3-aminopropoxy)propyltrimethoxysilane, and 25 parts of gamma-aminopropyltrimethoxysilane. This reaction mixture was thoroughly mixed and then 0.7 part water was added with stirring. This resulted in an organopolysiloxane copolymer within the scope of the present invention having a viscosity of about 150 centistokes containing about 7.9 percent by weight methoxy groups and in which 79.3 mole percent of the siloxane units were derived from the silanol chain-stopped polydimethylsiloxane, 6.4 mole percent of the siloxane units were derived from 3-(3-aminopropoxy)propyltrimethoxysilane, and 14.3 mole percent of the siloxane units were derived from gamma-aminopropyltrimethoxysilane.

EXAMPLE 2

Seven parts of the copolymer of Example 1 was converted to the partial aliphatic carboxylic acid salt by reaction with 0.35 part acetic acid to produce a product in which 39 mole percent of the amine groups were converted to the amine salt of acetic acid.

EXAMPLE 3

The partial acetic acid salt of Example 2 was incorporated into a polish emulsion by forming a mixture of 2.62 parts of the salt, 2 parts of a methyl silicone oil having a viscosity of 10,000 centistokes at 25° C., 2 parts of a sorbitan monooleate emulsifier, 0.2 part of a polyoxyethylene sorbitan monooleate emulsifier, 20.0 parts mineral spirits, and 15.0 parts kerosene. After these components were thoroughly mixed, 50.3 parts of water was added with high shear agitation to form an emulsion. To this emulsion was then added 8.0 parts of aluminum silicate to produce a combination cleaner-polish emulsion within the scope of the present invention. One sample of this emulsion was retained for evaluation of emulsion stability and was stable after 6 months. As a first control, a copolymer was made an in Example 1, but was not converted to the partial carboxylic acid salt. Instead, this copolymer was converted directly into an emulsion using the exact formulation described above. This control was stable at room temperature for less than 2 days before separating.

As a second control, the procedure of Example 1 was followed to produce a copolymer from 60 parts of the silanol chain-stopped polydimethylsiloxane and 40 parts of the gamma-aminopropyltrimethoxysilane, but with none of the 3-(3-aminopropoxy)propyltrimethoxysilane. Following the procedure of Example 2, this material was converted to a partial acetic acid salt in which 37 percent of the amine groups had been converted to the acetic acid salt of the amine and then the salt was added to a polish formulation as a substitute for the salt of the present invention. This, too, resulted in a stable emulsion.

In order to compare the compositions of the present invention prepared in Example 3 with the second control, which differed only by omission of the 3-(3-aminopropoxy)propyltrimethoxysilane, two sections of a painted automobile panel were polished side by side with each composition. The composition of the present invention had much better gloss than the second control, was much easier to rub out than the second control, and showed less streaking than the control. Both compositions were evaluated for detergent resistance and were unaffected by 30 detergent washing cycles. Each detergent washing cycle involved washing the panel in a 3 percent solution of a conventional automobile washing detergent at a temperature of 120° F. The panels were then washed with water and air dried.

EXAMPLE 4

This example illustrates the preparation of an abrasive polish formulation utilizing an in situ preparation of the partial aliphatic carboxylic acid salt. A first composition was prepared by mixing 2.5 parts of the organopolysiloxane copolymer of Example 1, 0.125 part acetic acid, which was equivalent to the amount necessary to convert 37% of the amine groups of the copolymer to acetic acid salts, 2.0 parts of the 10,000 centistoke methyl silicone fluid, 2.0 parts of the sorbitan monooleate emulsifier, 0.2 part of a polyoxyethylene sorbitan monooleate emulsifier, 20.0 parts mineral spirits, and 15.0 parts kerosene. After thoroughly mixing these components, 50.3 parts of water were added with high shear agitation and after the emulsion had been formed, 8.0 parts aluminum silicate was added with medium agitation. This emulsion was stable in excess of 3 months, and was equivalent to the product of Example 3 in rub-out, gloss and detergent resistance.

EXAMPLE 5

Following the procedure of Example 1, a mixture was formed of 60 parts of the silanol chain-stopped polydimethylsiloxane of Formula 1 where $n$ is equal to 5, 20 parts of gamma-aminopropyltrimethoxysilane and 20 parts of 3-(3-aminopropoxy)propyltrimethoxysilane. After these reactants had come to equilibrium, 0.5 part water was added and the reaction mixture was stirred to produce a product which contained 8.3 weight percent silicon-bonded methoxy groups and which had a viscosity of 150 centistokes at 25° C. To this reaction mixture was added 12.5 parts of oleic acid which was sufficient to convert 22.4 percent of the amine groups of the copolymer to oleic acid salt radicals. A non-abrasive polish emulsion was prepared by mixing 3 parts by weight of this partial salt, 4 parts of a polyoxyethylene nonyl phenol, 13 parts isoparaffin, 20 parts kerosene and 60 parts water. After thorough mixing these materials under high shear agitation, the resulting emulsion was evaluated as an automobile polish and was found to have excellent rub-out, spreadability, high gloss, and withstood more than 15 detergent wash cycles.

EXAMPLES 6 TO 11

These examples illustrate the effect of varying the percentage of amine of the organopolysiloxane copolymer of the present invention which is converted to the aliphatic carboxylic acid salt. In particular, 100 parts of the organopolysiloxane copolymer prepared in Example 1 was mixed with varying amounts of acetic acid to neutralize varying percentages of the amine groups. The resulting series of partial salts and a control (Example 11, in which all of the amine was neutralized) were converted to emulsions employing the proportions of components and techniques of Example 3, and the emulsion stability and the detergent resistance of each of the emulsions was evaluated. In the table below are listed the parts of acetic acid per 100 parts of copolymer, the percent of amine neutralized, the number of days in which the resulting emulsion was stable, and the number of detergent wash cycles the polish withstood.

TABLE 2

| | Example Number | | | | | |
|---|---|---|---|---|---|---|
| | 6 | 7 | 8 | 9 | 10 | 11 |
| Parts acetic acid | 1.2 | 1.5 | 3.0 | 4.5 | 4.85 | 12.0 |
| Percent amine neutralized | 10 | 12 | 25 | 34 | 40 | 100 |
| Stability, days | 15 | 30 | >90 | >90 | >90 | >90 |
| Detergent resistance, cycles | >30 | >30 | >30 | 25 | 15 | 1 |

EXAMPLE 12

A furniture polish formulation was prepared by forming a mixture of 2.0 parts of the partial acid salt of Example 2, 27.50 parts of refined mineral spirits, 1.25 parts of an emulsifiable microcrystalline wax, 1.20 parts of a sorbitan sesquioleate, 2.48 parts of a 100 centistoke methyl silicone fluid, and 0.32 part of a 30,000 centistoke methyl silicone fluid. This mixture was added to 62.25 parts water under high shear agitation to form an emulsion which was stable in excess of 10 days. As a control, another formulation was prepared except that instead of the partial acid salt of Example 2, the composition contained 2 parts of the organopolysiloxane copolymer of Example 1. This material was stable for less than 10 minutes. When both of these materials were applied to a highly polished walnut surface, the formulation containing the partial amine salt was easier to rub out and had a higher gloss than the acid-free composition.

EXAMPLES 13 THROUGH 18

In order to illustrate the variation in proportions of the aminoalkoxyalkylsilane of Formula 3, the aminoalkylsilane of Formula 2, and the silanol chain-stopped fluid of Formula 1, a series of organopolysiloxane copolymers within the scope of the present invention were made in which the starting materials consisted of 100 parts of a mixture of the silanol fluid of Formula 1 in which R is methyl and $n$ has a value of about 5, 3-(3-aminopropoxy) propyltrimethoxysilane and gamma-aminopropyltrimethoxysilane. To 100 parts of each of these mixtures, a sufficient amount of water was added to provide a fluid having a viscosity of about 150 centistokes at 25° C. Each of these materials was then reacted with sufficient acetic acid to convert 30 mole percent of the amine groups to acetic acid salts and each was converted to a polish composition using the formulation of Example 3. Each polish composition was found to be stable in excess of 90 days and to survive more than 30 detergent wash cycles. In Table 3 below are listed the parts by weight of the 3-(3-aminopropoxy)propyltrimethoxysilane (aminopropoxypropyl), the parts of aminopropyltrimethoxysilane (aminopropyl) and the parts of silanol chain-stopped polydimethylsiloxane (silanol fluid) employed in each composition. The methoxy content of the copolymer is also listed in the table, as well as the detergent resistance as measured in detergent wash cycles.

TABLE 3

| | Example Number | | | | | |
|---|---|---|---|---|---|---|
| | 13 | 14 | 15 | 16 | 17 | 18 |
| Aminopropoxypropyl | 2.2 | 10.6 | 9.5 | 7.1 | 53.3 | 5.7 |
| Aminopropyl | 7.5 | 63.8 | 1.8 | 10.4 | 17.6 | 69.1 |
| Silanol fluid | 90.3 | 25.6 | 88.7 | 82.5 | 29.1 | 25.2 |
| Methoxy content, percent | 1.5 | 6.0 | 1.7 | 1.8 | 4.5 | 4.0 |
| Detergent resistance cycles | 30 | 15 | 33 | 40 | 12 | 10 |

EXAMPLE 19

To a reaction vessel was charged 59 parts of a silanol chain-stopped polydimethylsiloxane within the scope of Formula 1 when $n$ was equal to about 5, 26 parts of gamma-aminopropyltrimethoxysilane, and 15 parts of 3 - (3 - aminopropoxy) - 2 - methylpropyltrimethoxysilane. After mixing thoroughly, 0.7 part water was added to produce an organopolysiloxane copolymer within the scope of the present invention having a viscosity of about 150 centistokes at 25° C. and containing about 4.4 percent by weight methoxy groups and in which 79.3 mole percent of the siloxane units were derived from the polydimethylsiloxane, about 14.3 percent from the aminopropylsilane and about 6.4 percent from the aminopropoxymethylpropylsilane. Five parts of acetic acid was then added to convert 37 mole percent of the amine groups to the acetic salt. This partial salt was converted to a polish emulsion employing the proportions of components and techniques of Example 3. When used as an automobile polish, this material was found to have excellent rub-out, spreadability, high gloss, and withstood more than 20 detergent wash cycles.

EXAMPLE 20

To a reaction vessel was charged 60 parts of a silanol chain-stopped polydiorganosiloxane in which the average molecule contained 18 dimethylsiloxane units, 1 diphenylsiloxane unit, and 1 methylethylsiloxane unit, 32.6 parts of delta-aminobutyltriethoxysilane, and 20.0 parts of 3-(4-aminobutoxy)propyltripropoxysilane. To this reaction mixture was added 1.5 parts of water and the viscosity of the reaction mixture at equilibrium was 60 centistokes and the combined weight per cents of silicon-bonded ethoxy and silicon-bonded propoxy radicals in the composition was 13.9 percent. To this reaction mixture was then added 2.16 parts of 2-ethylhexanoic acid which was sufficient to neutralize 25 percent of the amine groups. The resulting partial carboxylic acid salt was employed in a furniture polish formulation using the formulation shown in Example 12. Upon application to the polished walnut surface, the resulting material exhibited a high gloss and was detergent resistant.

EXAMPLE 21

Four different mixtures of components were prepared. Mixture A consisted of 3 parts of a 350 centistoke polydimethylsiloxane fluid chain-stopped with trimethylsiloxy groups, 2.5 parts oleic acid, and 17.5 parts of isoparaffins sold under the trade name Isopar-M (Humble Oil Company). Mixture B consisted of 48.2 parts water, 2.0 parts morpholine, 0.1 part of a carboxyvinyl polymer solid under the trade name Carbopol 934 (B. F. Goodrich), and 0.1 part triethanol amine. Mixture C consisted of 5 parts of the isoparaffin and 2 parts of the partial acetic acid salt of Example 2. Mixture D consisted of 10 parts water, 10 parts of aluminum silicate, and 0.1 part of ammonium hydroxide. Mixture A was added to Mixture B with high speed agitation, Mixture C was then added with high shear agitation, and then milled to a stable emulsion and finally Mixture D was added slowly with good mixing. The resulting polish emulsion was stable in excess of 6 months and, when applied to an automobile test panel, exhibited easy rub-out, high gloss, and over thirty wash cycles of detergent resistance.

EXAMPLE 22

The catalyst solution which was used in the following SiH-olefin addition reaction was a platinum coordinate catalyst solution formed by the reaction of chloroplatinic acid and octyl alcohol. The preparation of the catalyst is disclosed in Example 1 of U.S. Pat. 3,220,972 of Lamoreaux. Chemical analysis of this solution showed it to contain 3.5 atoms of chlorine per atom of platinum and 0.035 gram of platinum per gram of solution.

To a one-necked flask was added 58 parts of allyl alcohol, 58 parts of methacrylonitrile and 63 parts of toluene. To the thimble of a Soxhlet extractor was added 10 parts of Rexyn 201, a polystyrene supported amine hydroxide ion-exhancge resin of the formula:

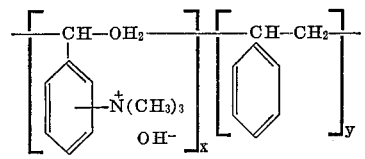

cross linked with 15% divinyl benzene where $x$ has an approximate value of over 1000 and $y$ has an approximate value of over 2000. The Soxhlet extractor was fitted with a reflux condenser and attached to the flask. The mixture was stirred at reflux by means of a magnetic stirrer. During a period of 5 hours the temperature slowly rose from 90° C. to 150° C. The toluene was then fractionally distilled from the reaction product at 350 mm. Hg. The pressure was dropped to 1.4 mm. Hg where the product distilled over at 53° C. There was obtained 100 parts of 3-(2-methyl-2-cyanoethoxy)propene-1 (98% of theory). In a 1000 ml. 3-necked flask equipped with magnetic stirrer, reflux condenser, thermometer, and addition funnel was placed 25.0 parts of 3-(2-methyl-2-cyanoethoxy) propene-1 and 0.2 part of platinum coordinate catalyst solution. To the addition funnel was charged 24 parts of trimethoxysilane. By means of a heating mantle, the olefin was heated to 140° C. The heating mantle was then turned off and the trimethoxysilane was added dropwise. Stirring was provided throughout the addition by means of the magnetic stirrer. An exothermic reaction was noted which carried the reaction temperature to 172° C. However, after about half of the silane had been added, the reaction temperature began to fall. Heat was again supplied to maintain a temperature of 170–175° C. during the remainder of the addition. Following the addition, the mixture was refluxed for an additional 2 hours (170° C.) then flash distilled at reduced pressure to recover the adduct. Thus was obtained 31.5 parts of material boiling at 135–140° C./3.5 mm. Hg whose infrared spectrum was consistent with the structure of 3-(2-methyl-2-cyanoethoxy) propyltrimethoxysilane.

Into a 500 ml. pressure bottle was placed 10.8 parts of 3 - (2-methyl-2-cyanoethoxy)propyltrimethoxysilane and 1.5 parts of Raney nickel catalyst. The bottle was then placed in a Parr hydrogenator and pressurized with hydrogen to 55 p.s.i. Shaking was started as the reaction mixture was heated to 100° C. As the pressure dropped to 30 p.s.i., additional hydrogen gas was introduced to maintain a pressure of 55 p.s.i. After a time interval of 8 hours a total pressure drop of 77 p.s.i. was recorded and further pressure drop did not occur. The excess pressure of the cooled system was eleased and a dark reddish brown liquid was decanted from the catalyst. Distillation yielded 7.0 parts of 3-(2-methyl-3-aminopropoxy)propyltrimethoxysilane BP 104° C./0.7 mm. An IR scan of the product showed complete absence of nitrile absorption and appearance of amine absorption at 2.9, 3.1 and 6.25 microns.

To a reaction vessel was added 60 parts of a silanol chain-stopped polydimethylsiloxane within the scope of Formula 1 in which $n$ was equal to about 5, 16 parts of 3-(2-methyl-3-aminopropoxy)propyltrimethoxysilane, and 25 parts of gamma-aminopropyltrimethoxysilane. This reaction mixture was thoroughly mixed and then 0.5 part water was added with stirring. This resulted in an organopolysiloxane copolymer within the scope of the present invention having a viscosity of about 150 centistokes containing about 7.9 percent by weight methoxy groups and in which 79.2 mole percent of the siloxane units were derived from the silanol chain-stopped polydimethylsiloxane, 6.8 mole percent of the siloxane units were derived from 3-(2-methyl-3-aminopropoxy)propyltrimethoxysilane, and 14.0 mole percent of the siloxane units were derived from gamma-aminopropyltrimethoxysilane.

EXAMPLE 23

Seven parts of the copolymer of Example 22 were converted to the partial aliphatic carboxylic acid salt by reaction with 0.35 part acetic acid to produce a product in which 38 mole percent of the amine groups were converted to the amine salt of acetic acid.

EXAMPLE 24

The partial acetic acid salt of Example 23 was incorporated into a polish emulsion by forming a mixture of 2.62 parts of the salt, 2 parts of a methyl silicone oil having a viscosity of 10,000 centistokes at 25° C., 2 parts of a sorbitan monooleate emulsfier, 0.2 part of a polyoxyethylene sorbitan monooleate emulsifier, 20.0 parts mineral spirits, and 15.0 parts kerosene. After these components were thoroughly mixed, 50.3 parts of water was added with high shear agitation to form an emulsion. To this emulsion was then added 8.0 parts of aluminum silicate to produce a combination cleaner-polish emulsion within the scope of the present invention. One sample of this emulsion was retained for evaluation of emulsion stability and was stable after 6 months. As a first control, a copolymer was made as in Example 1, but was not converted to the partial carboxylic acid salt. Instead, this copolymer was converted directly into an emulsion using the exact formulation described above. This control was stable at room temperature for less than 2 days before separating.

As a second control, the procedure of Example 1 was followed to produce a copolymer from 60 parts of the silanol chain-stopped polydimethylsiloxane and 40 parts of the gamma-aminopropyltrimethoxysilane, but with none of the 3-(2-methyl-3-aminopropoxy)propyltrimethoxysilane. Following the procedure of Example 2, this material was converted to a partial acetic acid salt in which 37 percent of the amine groups had been converted to the acetic acid salt of the amine and then the salt was added to a polish formulation as a substitute for the salt of the present invention. This, too, resulted in a stable emulsion.

In order to compare the compositions of the present invention prepared in Example 23 with the second control, which differed only by omission of the 3-(2-methyl-3-aminopropoxy)propyltrimethoxysilane, two sections of a painted automobile panel were polished side by side with each composition. The composition of the present invention had much better gloss than the second control, was much easier to rub out than the second control, and showed less streaking than the control. Both compositions were evaluated for detergent resistance. The control survived 30 detergent washing cycles and the polish composition containing the 3-(2-methyl-3-aminopropoxy)propyltrimethoxysilane survived 40 detergent washing cycles. Each detergent washing cycle involved washing the panel in a 3 percent solution of a conventional automobile washing detergent at a temperature of 120° F. The panels were then washed with water and air dried.

EXAMPLE 25

To a one-necked flask was added 58 parts of allyl alcohol and a catalyst solution consisting of 5 parts of 40% benzyltrimethylammonium hydroxide in methanol and 63 parts of toluene. The catalyst was thoroughly mixed into the allyl alcohol and the mixture was heated to 85° C. Crotononitrile was then added dropwise. The reaction was very exothermic and was controlled by rate of addition to a range of 110–130° C. After 58 parts of crotononitrile had been added the reaction mixture was heated at 120° C. for two hours. Then the base was neutralized with trimethylchlorosilane and the reaction product was cooled. The pressure was dropped to 0.5 mm. Hg where the product distilled over at 52° C. There was obtained 86 parts of 3-(1-methyl - 2 - cyanoethoxy)propene-1 (85% of theory).

In a 1000 ml. 3-necked flask equipped with magnetic stirrer, reflux condenser, thermometer, and addition funnel was placed 25.0 parts of 3-(1-methyl-2-cyanoethoxy) propene and 0.2 part of the platinum coordinate catalyst solution described in Example 22. To the addition funnel was charged 24 parts of the trimethoxysilane. By means of a heating mantle, the olefin was heated to 140° C. The heating mantle was then turned off and the trimethoxysilane was added dropwise. Stirring was provided throughout the addition by means of the magnetic stirrer. An exothermic reaction was noted which carried the reaction temperature to 130–160° C. Following the addition, the mixture was refluxed for an additional 12 hours then flash distilled at reduced pressure to recover the adduct. Thus was obtained 30 parts of material boiling at 120–127° C./1.5 mm. Hg whose infrared spectrum was consistent with the structure of 3-(1-methyl-2-cyanoethoxy)propyltrimethoxysilane.

Into a 500 ml. pressure bottle was placed 10.8 parts of 3-(1-methyl - 2 - cyanoethoxy)propyltrimethoxysilane and 1.5 parts of Raney nickel catalyst. The bottle was then placed in a Parr hydrogenator and pressurized with hydrogen to 55 p.s.i. Shaking was started as the reaction mixture was heated to 100° C. As the pressure dropped to 30 p.s.i., additional hydrogen gas was introduced to maintain a pressure of 55 p.s.i. After a time interval of 8 hours a total pressure drop of 77 p.s.i. was recorded and further pressure drop did not occur. The excess pressure of the cooled system was released and a dark reddish brown liquid was decanted from the catalyst. Distillation yielded 7.0 parts of 3-(1-methyl-3-aminopropoxy)propyltrimethoxysilane B.P. 120° C./1.5 mm. Hg. An IR scan of the product showed complete absence of nitrile absorption and appearance of amine absorption at 2.9, 3.1 and 6.25 microns.

To a reaction vessel was added 60 parts of a silanol chain-stopped polydimethylsiloxane within the scope of Formula 1 in which n was equal to about 5, 16 parts of 3-(1-methyl-3 - aminopropoxy)propyltrimethoxysilane, and 25 parts of gamma-aminopropyltrimethoxysilane. This reaction mixture was thoroughly mixed and then 0.5 part water was added with stirring. This resulted in an organopolysiloxane copolymer within the scope of the present invention having a viscosity of about 150 centistokes containing about 7.9 percent by weight methoxy groups and in which 79.2 mole percent of the siloxane units were derived from the silanol chain-stopped polydimethylsiloxane, 6.8 mole percent of the siloxane units were derived from 3-(1-methyl-3-aminopropoxy)propyltrimethoxysilane, and 14.0 mole percent of the siloxane units were derived from gamma-aminopropyltrimethoxysilane.

EXAMPLE 26

Seven parts of the copolymer of Example 25 were converted to the partial aliphatic carboxylic acid salt by reaction with 0.35 part acetic acid to produce a product in which 38 mole percent of the amine groups were converted to the amine salt of acetic acid.

EXAMPLE 27

The partial acetic acid salt of Example 26 was incorporated into a polish emulsion by forming a mixture of 2.62 parts of the salt, 2 parts of a methyl silicone oil having a viscosity of 10,000 centistokes at 25° C., 2 parts of a sorbitan monooleate emulsifier, 0.2 part of a polyoxyethylene sorbitan monooleate emulsifier, 20.0 parts mineral spirits, and 15.0 parts kerosene. After these components were thoroughly mixed, 50.3 parts of water were added with high shear agitation to form an emulsion. To this emulsion was then added 8.0 parts of aluminum silicate to produce a combination cleaner-polish emulsion within the scope of the present invention. One sample of this emulsion was retained for evaluation of emulsion stability and was stable after 8 months. As a first control, a copolymer was made as in Example 1, but was not converted to the partial carboxylic acid salt. Instead, this copolymer was converted directly into an emulsion using the exact formulation described above. This control was stable at room temperature for less than 2 days before separating.

As a second control, the procedure of Example 1 was followed to produce a copolymer from 60 parts of the silanol chain-stopped polydimethylsiloxane and 40 parts of the gamma - aminopropyltrimethoxysilane, but with none of the 3-(1-methyl-3-aminopropoxy)propyltrimethoxysilane. Following the procedure of Example 2, this material was converted to a partial acetic acid salt in which 37 percent of the amine groups had been converted to the acetic acid salt of the amine and then the salt was added to a polish formulation as a substitute for the salt of the present invention. This resulted in an emulsion which had a storage stability in excess of six months.

In order to compare the compositions of the present invention prepared in Example 27 with the second control, which differed only by omission of the 3-(1-methyl-3-aminopropoxy)propyltrimethoxysilane, two sections of a painted automobile panel were polished side by side with each composition. The composition of the present invention had much better gloss than the second control, was much easier to rub out than the second control, and showed less streaking than the control. Both the compositions were evaluated for detergent resistance. The control survived 30 detergent washing cycles and the polish composition containing the 3-(1-methyl-3-aminopropoxy)propyltrimethoxysilane survived 15 detergent washing cycles.

While the foregoing examples have illustrated many of the embodiments of our invention, it should be understood that our invention relates broadly to the defined organopolysiloxane copolymers prepared from silanol chain-stopped polydiorganosiloxanes, aminoalkoxyalkylsilanes and aminoalkylsilanes. These compositions are useful for conversion to partial salts of aliphatic carboxylic acids which are part of the present invention, and these partial salts are especially useful in the formulation of polish emulsions of good stability, of good spreadability, of high gloss, and of high detergent resistance. These polish compositions are useful in the polishing of all types of painted and lacquered surfaces and are not limited to surfaces of automobiles and to furniture.

What we claim as new and desire to secure by Letters Patent of the United States is:

1. An organopolysiloxane copolymer comprising the partial hydrolysis and condensation product of (1) a liquid silanol chain-stopped polydiorganosiloxane having the formula:

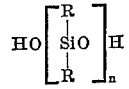

where R is a monovalent hydrocarbon radical free of aliphatic unsaturation and n has a value of from about 2 to 20, inclusive, (2) an aminoalkylsilane having the formula:

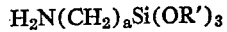

and (3) an aminoalkoxyalkylsilane having the formula:

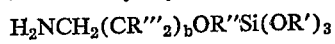

where R' is a lower alkyl radical, R" is a divalent alkylene radical having from 2 to 6 carbon atoms, R'" is a monovalent organic radical or hydrogen, and a is an integer equal to from 3 to 6, and b is an integer equal to from 2 to 5, inclusive, said copolymer having a viscosity of from about 5 to 1,000 centistokes at 25° C. and containing from about 1 to 15 percent by weight —OR' radicals, based on the weight of said copolymer, the proportions of said polydiorganosiloxane, said aminoalkylsilane and said aminoalkoxyalkylsilane being selected to provide a total of from 0.04 to 1.0 siloxane units derived from said aminoalkylsilane and said aminoalkoxyalkylsilane per siloxane unit derived from said polydiorganosiloxane and from about 0.25 to 9.0 siloxane units derived from said aminoalkylsilane per siloxane unit derived from said aminoalkoxyalkylsilane.

2. A copolymer of claim 1 in which R is methyl.

3. A copolymer of claim 1 in which said aminoalkylsilane is gamma-aminopropyltrimethoxysilane.

4. A copolymer of claim 1 in which said aminoalkoxyalkylsilane is 3 - (2 - methyl-3-aminopropoxy)propyltrimethoxysilane.

5. A composition of claim 1 in which R is methyl, said aminoalkylsilane is gamma-aminopropyltrimethoxysilane, and said aminoalkoxyalkylsilane is 3-(2-methyl-3-aminopropoxy)propyltrimethoxysilane.

6. A composition of claim 1 in which R is methyl, said aminoalkylsilane is gamma-aminopropyltrimethoxysilane and said aminoalkoxyalkylsilane is 3-(3-aminopropoxy)-2-methylpropyltrimethoxysilane.

7. A partial aliphatic carboxylic acid salt of said organopolysiloxane copolymer of claim 1 in which from 10 to 50 percent of the amine groups of aminoalkyl radicals of said aminoalkylsilane and said aminoalkoxyalkylsilane are converted to amine salts of aliphatic carboxylic acid.

8. A partial aliphatic carboxylic acid salt of claim 7 in which said carboxylic acid is acetic acid.

9. A partial aliphatic carboxylic acid salt of said organopolysiloxane copolymer of claim 5 in which from 10 to 50 percent of the amine groups of said gamma-aminopropyltrimethoxysilane and said 3-(2-methyl-3-aminopropoxy)propyltrimethoxysilane are converted to amine salts of aliphatic carboxylic acid.

10. A partial aliphatic carboxylic acid salt of the organopolysiloxane copolymer of claim 9 in which said aliphatic carboxylic acid is acetic acid.

11. A polish emulsion of improved rub-out, improved gloss and improved detergent resistance comprising water, a partial aliphatic carboxylic acid salt of claim 7, a hydrocarbon solvent and an emulsifying agent.

12. A polish emulsion of improved rub-out, improved gloss, and improved detergent resistance comprising water, a partial aliphatic carboxylic acid salt of claim 8, a hydrocarbon solvent, and an emulsifying agent.

13. A polish emulsion of improved rub-out, improved gloss and improved detergent resistance comprising water, a partial aliphatic carboxylic acid salt of claim 9, a hydrocarbon solvent, and an emulsifying agent.

14. A polish emulsion of improved rub-out, improved gloss, and improved detergent resistance comprising water, a partial aliphatic carboxylic acid salt of claim 10, a hydrocarbon solvent, and an emulsifying agent.

15. The composition of claim 1, further characterized by R''' being hydrogen.

References Cited

UNITED STATES PATENTS

| 2,755,194 | 7/1956 | Volkmann et al. | 106—11 |
| 3,044,982 | 7/1962 | Jex et al. | 260—46.5 |
| 3,045,036 | 7/1962 | Jex et al. | 260—46.5 |
| 3,341,338 | 9/1967 | Pater | 106—287 |
| 3,355,424 | 11/1967 | Brown | 260—46.5 |
| 3,392,143 | 7/1968 | Holub | 260—46.5 |
| 3,392,144 | 7/1968 | Holub | 260—46.5 |

JULIUS FROME, Primary Examiner

A. H. KOECKERT, Assistant Examiner

U.S. Cl. X.R.

106—3, 11, 287; 260—46.5, 448.2, 448.8